United States Patent
Liu

(10) Patent No.: US 6,792,106 B1
(45) Date of Patent: Sep. 14, 2004

(54) ECHO CANCELLER AND METHOD OF ECHO CANCELLATION USING AN NLMS ALGORITHM

(75) Inventor: Jianfeng Liu, Shanghai (CN)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/398,016

(22) Filed: Sep. 17, 1999

(51) Int. Cl.[7] .............................................. H04M 9/08
(52) U.S. Cl. ........................ 379/406.05; 379/406.01; 379/406.02; 379/406.09; 370/286; 370/289
(58) Field of Search ....................... 379/406.01, 406.05, 379/406.06, 406.08, 406.09, 380, 390.02, 390.04, 402, 406.02; 370/286, 289, 291

(56) References Cited

U.S. PATENT DOCUMENTS

| | | | | |
|---|---|---|---|---|
| 5,307,405 A | * | 4/1994 | Sih | 379/406.08 |
| 5,559,881 A | * | 9/1996 | Sih | 379/406.08 |
| 5,646,991 A | * | 7/1997 | Sih | 379/406.08 |
| 5,687,229 A | * | 11/1997 | Sih | 379/406.09 |
| 5,937,009 A |   | 8/1999 | Wong et al. | 375/286 |
| 5,951,626 A | * | 9/1999 | Duttweiler | 708/322 |
| 6,028,929 A | * | 2/2000 | Laberteaux | 379/410 |
| 6,029,126 A |   | 2/2000 | Malvar | 704/204 |
| 6,058,362 A |   | 5/2000 | Malvar | 704/230 |
| 6,115,689 A |   | 9/2000 | Malvar | 704/503 |
| 6,181,753 B1 | * | 1/2001 | Takada et al. | 375/346 |
| 6,181,794 B1 | * | 1/2001 | Park et al. | 379/410 |
| 6,198,819 B1 | * | 3/2001 | Farrell et al. | 379/410 |
| 6,201,866 B1 | * | 3/2001 | Ariyama et al. | 379/410 |
| 6,219,418 B1 | * | 4/2001 | Eriksson et al. | 379/407 |
| 6,507,652 B1 | * | 1/2003 | Laberteaux | 379/406.05 |
| 6,516,063 B1 | * | 2/2003 | Farrell et al. | 379/406.08 |
| 6,526,141 B2 | * | 2/2003 | Benesty et al. | 379/406.09 |
| 6,700,978 B2 | * | 3/2004 | Bershad et al. | 379/406.08 |

OTHER PUBLICATIONS

D.L. Duttweiler, "A Twelve–Channel Digital Echo Canceler," IEEE Trans. on Comm., vol. COM–26, No. 5, pp. 647–653, May 1978.

F. Casco et al., "A Variable Step Size (VSS–CC) NLMS Algorithm," IEICE Trans. Fundamental, vol. E78–A, No. 8, pp. 1004–1009, Aug. 1995.

K. Fujii et al., "Double–Talk Detection Method with Detecting Echo Path Fluctuation," Electronics and Communications in Japan, Part 3, vol. 78, No. 4, pp. 82–93, 1996.

* cited by examiner

*Primary Examiner*—Binh Tieu

(57) ABSTRACT

An echo canceller and a method of echo cancellation using an NLMS algorithm. The NLMS algorithm alternates adaptation between a slow mode, aggressive mode, and inhibition mode, according to the status of the echo canceller. This implementation requires no correlation information. This implementation is simple and not very time consuming. During initial conversation, the NLMS algorithm is in an aggressive mode to ensure fast convergence. After convergence, the NLMS algorithm switches to a slow mode for lower residual echo return. Whenever an abrupt increase of residual echo caused by either double talk or echo path change is detected, the current adaptive filter coefficients are retained and then updated in the aggressive mode. The decision as to which echo estimation (the response of the retained filter or the response of the aggressively adapted filter) is subtracted from the reference echo for echo cancellation within a short detection delay period is determined according to the Geigel algorithm. After the short delay, the NLMS algorithm makes a more accurate determination of double talk or echo path occurrence. If double talk is detected according to the more accurate determination, then the retained filter taps are applied to yield the residual echo and the inhibition mode is chosen and maintained until the error signal again decreases to the pre-changed value range. Otherwise, the aggressively adapted filter taps are applied to yield the residual echo and the system switches to aggressive mode adaptation until a new convergence is achieved. This implementation also has high convergence rate, high stability, and a small detection delay.

28 Claims, 3 Drawing Sheets

ECHO CANCELLER AND METHOD OF ECHO CANCELLATION USING AN NLMS ALGORITHM

BACKGROUND OF THE INVENTION

Echo cancellation is a very good way to remove undesirable echo in communication systems. FIG. 1 illustrates a block diagram of a transmission network employing a conventional echo canceller. The echo canceller 200 is connected to a digital network 100 and a hybrid 230 via unidirectional paths 203 and 205. The dashed lines in connections 203 and 205 are used to indicate that the connections may be of a sufficient length to cause an echo signal to be subjectively annoying. Such an echo originates at hybrid 230 which is connected to a telephone S2, via path 202.

A widely used adaptation algorithm for updating the coefficients vector in the echo canceller 200 is illustrated in FIG. 2. This adaptation algorithm is a normalized LMS (NLMS) algorithm 210 given by:

$$h_{k+1} = h_k + \frac{a}{\|x_k\|^2} \cdot e_k \cdot x_k, \quad \text{with} \tag{1}$$

$$e_k = x_k^T \cdot (g - h_k) + n_k \tag{2}$$

$$d_k = x_k^T \cdot g + n_k, \tag{3}$$

where $h_k$ is the echo canceller coefficient-vector 212, $x_k$ is the input vector, $e_k$ is the residual echo, $d_k$ is the reference echo, $0<\alpha<2$ is a scalar that controls the stability and convergence rate, $\|x_k\|^2$ is the norm of the input vector $x_k$, g is the actual echo path coefficient vector 214, and $n_k$ is additive noise (or near-end speech in the case of double talk).

The choice of $\alpha$ is critical for good performance of the echo canceller 200. A small $\alpha$ value will ensure small misadjustment in the steady state and is needed for noise insensitivity. However, a small $\alpha$ value brings about low convergence speed. A large $\alpha$ value will in general provide faster convergence and better tracking capabilities at the cost of higher excess mean-squared error in the steady state. As a result, the appropriate choice of $\alpha$ is a major issue for suitable adaptation in the NLMS algorithm 210.

In prior literature, great efforts have been made to control automatic adjustment of the convergence rate (including echo path change and double talk detection). In D. L. Duttweiler, "A twelve-channel digital echo canceller," IEEE Trans. On Communications, Vol. COM-26, No. 5, pp. 647–653, May 1978, the Geigel algorithm is presented for double talk detection. The Geigel algorithm compares the magnitude of the current sample of $d_k$ with a current value of $x_{max,k}$. If the magnitude of $d_k$ is least −6 dB higher than $x_{max,k}$, then double talk is determined to be present. The Geigel algorithm is simple and fast. However, when the magnitude of $d_k$ is −6 dB lower than $x_{max,k}$ during double talk, the Geigel algorithm fails to detect the double talk. The Geigel algorithm is also sensitive to near-end noise interference.

Other than the Geigel algorithm, many other methods based on correlation are known initiated for automatic adaptation and double talk detection/echo path change detection. In F. Casco et al., "A variable step size NLMS algorithm," IEICE Trans. Fundamentals, Vol. E78-A, No. 8, pp. 1004–1009, August 1995, a variable step size LMS FIR adaptive filter algorithm is proposed. In this algorithm, the step size adjustment $\alpha$ is controlled by the correlation between the residual echo $e_k$ and the reference echo $d_k$. However, the effectiveness of this algorithm has only been proven with a white noise input. K. Fujii and J. Ohga, "Double-talk detection method with detecting echo path fluctuation," Electronics and Communications in Japan, Part 3, Vol. 78, No. 4, pp. 82–93, 1996, proposes using the normalized cross correlation between the reference echo $d_k$ and the estimated echo $$y_k(x_k^T \cdot h_k) \tag{4}$$

for discriminating double talk from the echo path change. With this method, it is assumed that in case of echo path change, the normalized cross correlation between $d_k$ and $y_k$ approaches zero while in case of double talk, the corresponding cross correlation approaches one. By observing the cross correlation behavior, double talk can be discriminated from the echo path change. There are, however, two problems with this method. First, when the echo path changes proportionally in magnitude, the normalized cross correlation may approach one or be larger than one, instead of zero. Second, in the case of double talk, the normalized correlation between the near end speech and the estimated echo might approach one (instead of the assumed zero) in a certain sample period, which makes it even harder to use the corresponding cross correlation for differentiation of double talk from echo path change.

As discussed above, there have been numerous attempts to design an effective echo canceller utilizing cross correlation. However, despite numerous efforts to perform adaptive filtering based on cross correlation information, there is no evidence that these adaptive filtering techniques may be successfully applied to methods for an NLMS echo cancellation purposes.

SUMMARY OF THE INVENTION

The present invention is directed to a simple and fast technique which does not use cross correlation information.

The basic idea of the invention is to alternate adaptation in the NLMS algorithm between slow mode, aggressive mode and inhibition mode according to different echo canceller status. During initial conversation, the NLMS algorithm is in an aggressive mode to ensure fast convergence. After convergence, the NLMS algorithm switches to a slow mode for lower residual echo return. Whenever an increase of residual echo caused by either double talk or echo path change is detected, the current adaptive filter coefficients are retained and then updated in the aggressive mode. The decision as to which echo estimation (the response of the retained filter or the response of the aggressively adapted filter) is subtracted from the reference echo for echo cancellation within a short detection delay period is determined according to the Geigel algorithm. If double talk is detected according to the Geigel algorithm within the short period, then the retained filter taps are applied to yield the residual echo. Otherwise, the aggressively adapted filter taps are applied to yield the residual echo. In order to decide more precisely whether double talk occurs or echo path change occurs, within the short period of Geigel detection, the current residual echo produced by the aggressively adapted filter is compared with the residual echo produced by retained filter. If the short-term averaged residual echo yielded by the aggressively adapted filter is always lower than the retained filter output, then it is determined that echo path change has occurred. The system is then updated with the aggressive mode output and switches to aggressive mode adaptation until a new convergence is achieved. Otherwise, it is determined that the residual echo increase is caused by double talk. The current filter taps are then updated with the retained filter taps and the inhibition (adaptation-frozen) mode is chosen and maintained until the error signal (residual echo) again decreases within a range of the pre-change value.

DETAILED DESCRIPTION OF THE PREFERRED EMBODIMENT

Figure 1:
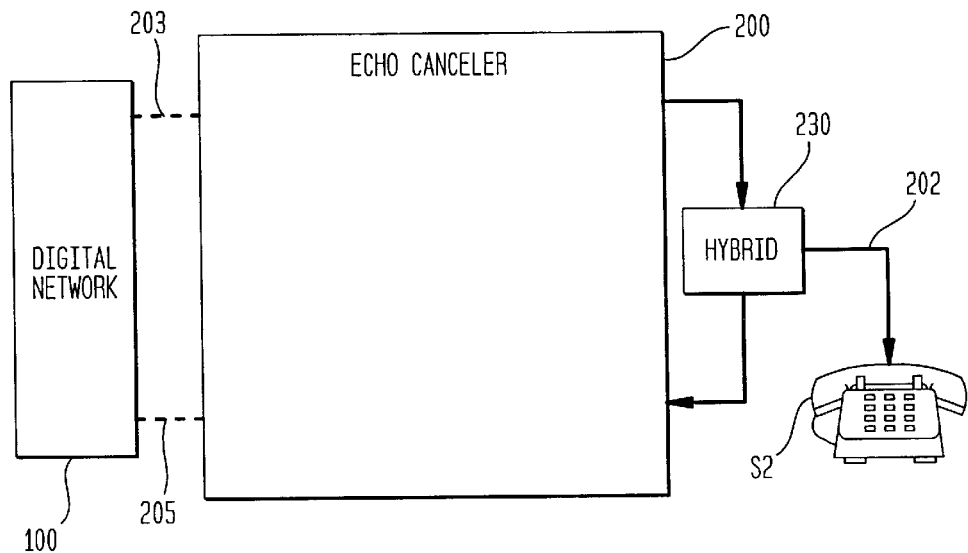
FIG. 1 illustrates a conventional transmission network employing a conventional echo canceller.

A general solution for adaptively canceling line echo generated by the hybrid 230 in the telephone network of FIG. 1 is as follows. When a new adaptation process starts or after a large change in the echo path, the convergence factor α is set to a relatively large value to ensure the fastest convergence rate (aggressive mode adaptation). After convergence is reached, α is switched to a smaller value to further reduce the returned echo and reduce the sensitivity of the echo canceller 200 to additive noise (slow mode adaptation). When double talk occurs, updating of the adaptive filter coefficients is inhibited (inhibition mode adaptation).

How to accurately alternate adaptation of the NLMS algorithm 210 between aggressive mode, slow mode and inhibition mode with as short delay as possible is discussed below with reference to the flowchart illustrated in FIG. 3.

A general description of the present invention is set below in connection with FIG. 3. First, a call is started (step 302 of FIG. 3). The NLMS algorithm 210 of the echo canceller 200 enters an aggressive mode adaptation, in order to ensure fast convergence (step 304 of FIG. 3). The NLMS algorithm 210 then determines whether convergence has been reached (step 306 of FIG. 3). If convergence has not occurred, the NLMS algorithm 210 returns to step 304. If convergence has occurred, the NLMS algorithm 210 enters a slow mode adaptation in order to reduce echo/noise (step 308 of FIG. 3). The NLMS algorithm 210 then monitors the residual echo for abrupt increases (step 310 of FIG. 3). If there are no abrupt increases, the NLMS algorithm 210 returns to step 308 and the slow mode adaptation is maintained. If an abrupt increase in the residual echo is detected, the residual echo is output according to the Geigel algorithm with a short delay (step 312 of FIG. 3). The NLMS algorithm 210 then makes a more accurate determination of double talk and echo path change occurrence after the short delay (step 314 of FIG. 3). Consequently, the NLMS algorithm 210 determines the cause of the abrupt increase in the residual echo (step 316 of FIG. 3). If the cause of the abrupt increase in the residual echo is double talk, the NLMS algorithm 210 initiates an inhibition mode adaptation, which prohibits coefficient update (step 318 of FIG. 3). After step 318, the NLMS algorithm 210 determines whether convergence has been reached again in step 320. If convergence has not been reached, the NLMS algorithm 210 returns to step 318. If convergence has been reached in step 320, the NLMS algorithm 210 determines whether the call has ended (step 322 of FIG. 3). If the call has ended, the NLMS algorithm 210 proceeds to step 324 to terminate its processing. If the call has not ended, the NLMS algorithm 210 proceeds to step 308 to reinitiate the slow mode adaptation.

Figure 3:
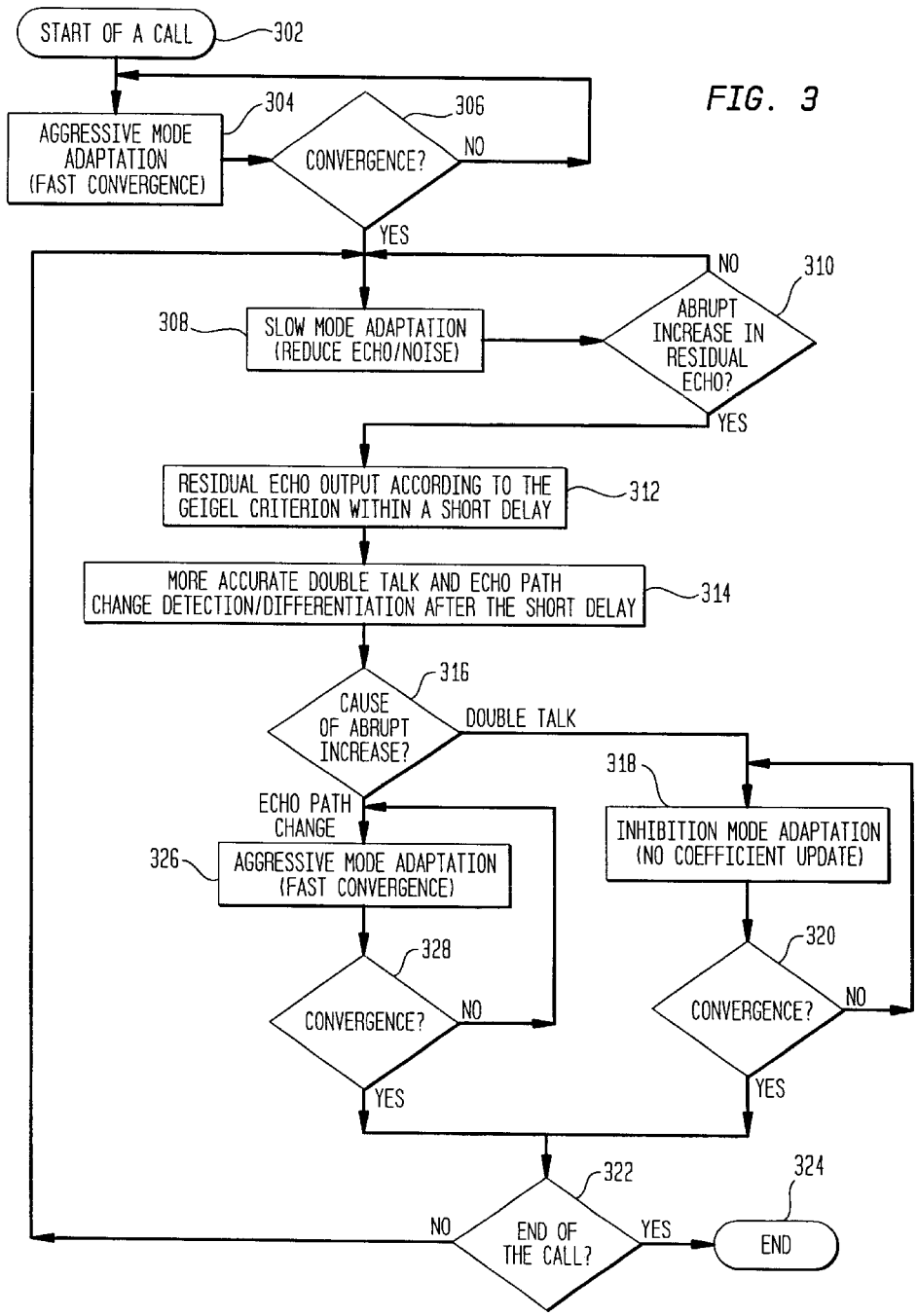
FIG. 3 illustrates a general flowchart performed by the echo canceller of the present invention in one embodiment.

In step 316, if the NLMS algorithm 210 determines that the cause of the abrupt increase was an echo path change, the NLMS algorithm 210 again enters the aggressive mode adaptation to ensure fast coefficient convergence (step 326 of FIG. 3). Again, the NLMS algorithm 210 determines whether convergence has occurred in step 328. If not, the NLMS algorithm 210 returns to step 326. If convergence has occurred in step 328, the NLMS algorithm 210 determines whether the end of the call has been reached (step 322 of FIG. 3). Similar to the inhibition mode adaptation, if the NLMS algorithm 210 determines that the end of the call has been reached (step 322 of FIG. 3), the NLMS algorithm 210 is terminated (step 324 of FIG. 3). If the end of the call has not been reached in step 322, the NLMS algorithm 210 proceeds to step 308 to reinitiate the slow mode adaptation.

A more detailed description of the present invention is set forth below in connection with FIG. 4. First, during the start of the call period (step 402 of FIG. 4), to ensure fast convergence, the convergence factor α is set to $\alpha_a$ ($\alpha_a$ may be chosen as 0.5) and the adaptation is initiated in the aggressive mode (step 404 in FIG. 4). When the residual echo decreases to a certain value, it is determined that the convergence status is reached and the adaptation is switched to the slow mode (step 406 in FIG. 4, $\alpha=\alpha_s$, where $\alpha_s$ is 0.04). In order to decide whether convergence is reached or not, the following criterion is applied (step 406 in FIG. 4):

if $|x_k|^2 > C \cdot |e_k|^2$, then convergence is reached; otherwise no convergence.

In step 406, |·| denotes short time windowed energy. The above short time window size can be chosen as 64 samples and C can be chosen as 1000. Note that, in the adaptation process, when there is no far end signal input, adaptation should be inhibited.

After convergence, the NLMS algorithm 210 monitors the residual echo level. Whenever $|x_k|^2 < C \cdot |e_k|^2$, i.e., an abrupt increase of residual echo is detected (step 408 in FIG. 4), either double talk or an echo path change has occurred. The NLMS algorithm 210 then memorizes the current sample time and the current adaptive filter taps (step 412 of FIG. 4). Concurrently, the filter taps are adapted in the aggressive mode. The initiative for the memorization of the current key parameters as well as the aggressive adaptation of the filter taps is as follows:

If the residual echo yielded by the aggressively adapted filter is denoted as e_agg=$d_k - h_k^t \cdot x_k$, where $h_k$ is the aggressively adapted filter vector at sample time k, and the residual echo yielded by the memorized filter taps is denoted as e_freeze=$d_k - h\_freeze^T \cdot x_k$, where h_freeze is the memorized filter vector. If the residual echo increase is due to echo path change, after certain period of aggressive mode adaptation, |e_agg| should be always lower than |e_freeze|. However, if the residual echo increase is due to double talk, then within a preset observation window, |e_agg| should be higher than |e_freeze| for at least a few sample times. According to this criterion, after a certain short period, the cause of the residual echo increase is determined. If the cause is due to echo path change, then the current filter taps are immediately updated with the aggressive adapted taps and the adaptation continues in the aggressive mode.

Otherwise, if the cause is due to double talk, then the current filter taps are immediately updated with the previously memorized (frozen) filter taps and the adaptation switches to the inhibition mode. No cancellation of near end speech is incurred.

Figure 4:
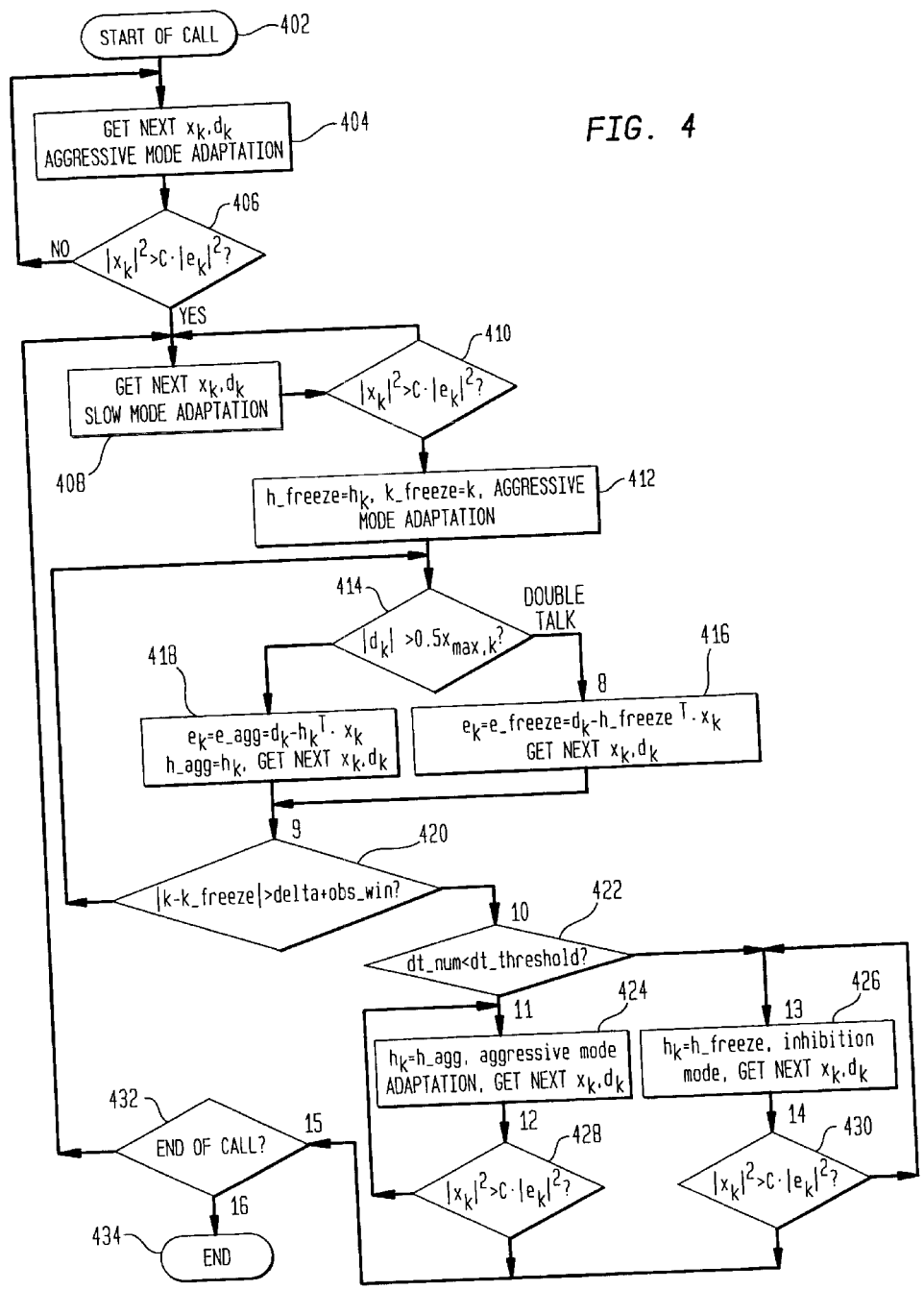
FIG. 4 illustrates a more detailed flowchart performed by the echo canceller of the present invention in one embodiment.

There is a detection delay between residual echo increase and discrimination of double talk and echo path change. To ensure that the performance is acceptable even during this short detection delay period, the conventional Geigel algorithm is applied. Despite numerous other methods proposed for double talk detection and despite the limitations inherent in the Geigel algorithm, the Geigel is still a widely used method in many commercial echo canceller products. After detection of a residual echo increase, the Geigel algorithm is used to determined whether:

$$|d_k|>0.5 x_{max,k} \quad (5)$$

is satisfied (step 414 in FIG. 4). If $|d_k|$ is greater than one half of $x_{max,k}$, then it is assumed that double talk occurs and the residual echo output is yielded by subtraction of the previously memorized (frozen) filter response (step 416 of FIG. 4). Otherwise, it is assumed that an echo path change has occurred and the aggressively adapted filter tap response is subtracted from the reference echo (step 418 of FIG. 4) to produce the residual echo output. After a certain period of time, delta, (delta can be chosen as tens or hundreds of samples, say 128 samples) has passed (step 420 of FIG. 4), |e_agg| is compared with |e_freeze| over a preset observation window obs_win (the observation window can also be chosen as hundreds of samples, for example 384). To take into account the possible side effect due to the fluctuation of the residual echo in echo path changes, the following differentiation criterion is applied:

Assume dt_num represents the number of occurrences when |e_agg| is greater than |e_freeze| within obs_win. If dt_num is smaller (step 422 of FIG. 4) than a preset small threshold value dt_threshold (dt_threshold may be set to 4 or 5 for example), then it is further determined that an echo path change has occurred. Parameters are then updated with the aggressive adaptation output (step 424 of FIG. 4), the adaptation continues in the aggressive mode. If the inequality in step 422 is not satisfied, then the current parameters are updated with the previously memorized (frozen) parameters (step 426 in FIG. 4). The adaptation then switches to the inhibition mode. The above adaptation states continue until it is detected again that $$|x_k|^2 > C \cdot |e_k|^2, \quad (6)$$

which means that either a new convergence state is reached or the double talk period has ended (step 428 or step 430 in FIG. 4). In either case, the adaptation returns (step 432 of FIG. 4) to the slow mode (step 408 in FIG. 4, $\alpha=\alpha_s$) and the process repeated until the end of the call (step 434 of FIG. 4).

The implementation of the NLMS algorithm 210 described above with regards to FIGS. 3 and 4 requires no correlation information. It is a simple implementation which is not time-consuming. The implementation of the NLMS algorithm 210 described above also has a high convergence rate and high stability. The resulting echo canceller 200 which implements the NLMS algorithm 210 described above is simple and fast.

Another advantage of the present invention is that it is capable of adaptively handling different initial sample periods, unlike other methods, which assume a constant initial period. As a result, the present invention provides additional flexibility for adaptively handling numerous systems.

Another advantage of the present invention is that there is only a very small delay between the accurate discrimination of double talk and echo path change and the updating of the corresponding filter taps. As a result, the negative effect due to detection delay is reduced in the present invention.

Further, the embodiment described above in FIG. 4 utilizes the advantages of the convention Geigel algorithm. In particular, in the example described in FIG. 4, the Geigel algorithm is used for simple and fast detection of double talk and echo path change within a short period. After the short detection period, further accurate discrimination of double talk and echo path changes is obtained to ensure good performance in the case of either double talk or echo path change.

The present invention, as described above, in particular with respect to the embodiment illustrated in FIG. 4, sets forth several specific parameters. However, the present invention should not be limited to these parameters (as more generally described with respect to FIG. 3), and such parameters could be easily modified by one of ordinary skill in the art to obtain the same desired result as the present invention.

Figure 2:
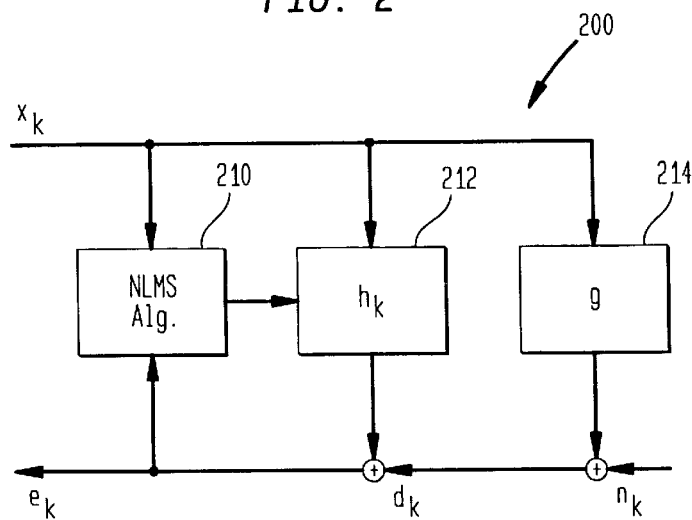
FIG. 2 illustrates a conventional normalized least mean squared (NLMS) algorithm implemented in the conventional echo canceller of FIG. 1.

Further, the present invention has been described above with respect to the hardware illustrated in FIG. 2 and the flowcharts illustrated in FIGS. 3–4. However, the functionality described above imparted to the echo canceller 200 could be loaded into the echo canceller 200 via either an article of manufacture or downloaded (via the Internet for example) as a propagated signal (with or without a carrier wave), as either an entire computer program or propagated signal or in code segments.

The NLMS algorithm 210 is further described above as a distinct entity of the echo canceller 200. However, as known to one of ordinary skill in the art, the NLMS algorithm 210 could be integrated with other entities, its functionality being implemented on a card and/or a chip in either hardware or software. Such modifications would be routine to one of ordinary skill in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of echo cancellation, comprising:
   executing a normalized least mean squared (NLMS) algorithm, switchable between an aggressive mode for faster convergence and a slow mode for lower residual echo; and
   wherein said NLMS algorithm is initialized in said aggressive mode.

2. The method of claim 1, wherein said method is non-correlative.

3. The method of claim 1, further comprising:
   detecting an abrupt increase in the residual echo and determining whether the increase in the residual echo is caused by double talk or an echo path change.

4. The method of claim 3, said detecting step including:
   retaining adaptive filter coefficients at the time of the detection of the increase in residual echo,
   updating the adaptive filter coefficients in the aggressive mode,
   within a given time period, making a rough determination as to whether the increase in the residual echo is caused by double talk or an echo path change, and
   after the given time period, making a fine determination as to whether the increase in the residual echo is caused by double talk or an echo path change.

5. The method of claim 4, said rough determining step implementing the Geigel algorithm.

6. The method of claim 4, said fine determining step including determining the number of occurrences where the residual echo yielded by the adaptive filter coefficients updated in the aggressive mode is greater than the residual echo yielded by the retained adaptive filter coefficients within a given observation window.

7. The method of claim 6, wherein if the number of occurrences where the residual echo yielded by the adaptive filter coefficients updated in the aggressive mode is greater than the residual echo yielded by the retained adaptive filter coefficients within a given observation window is more than a few, the residual echo increase is caused by double talk, otherwise the residual echo increase is caused by an echo path change.

8. The method of claim 4, further comprising:
if the increase in the residual echo is caused by an echo path change, updating current filter coefficients with the adaptive filter coefficients updated in the aggressive mode and continuing in the aggressive mode, and if the increase in the residual echo is caused by double talk, updating the current filter coefficients with the retained adaptive filter coefficients and continuing in an inhibition mode.

9. The method of claim 1, wherein upon call initiation, the NLMS algorithm is in the aggressive mode and once convergence is reached, switches to the slow mode.

10. An echo canceller, comprising:
a normalized least mean squared (NLMS) processor for executing an NLMS algorithm, said NLMS processor being switchable between an aggressive mode for faster convergence and a slow mode for lower residual echo; and
wherein said NLMS algorithm is initialized in said aggressive mode.

11. The echo canceller of claim 10, wherein said echo canceller is non-correlative.

12. The echo canceller of claim 10, said NLMS processor further detecting an abrupt increase in the residual echo and determining whether the increase in the residual echo is caused by double talk or an echo path change.

13. The echo canceller of claim 12, said NLMS processor further retaining adaptive filter coefficients at the time of the detection of the increase in residual echo, updating the adaptive filter coefficients in the aggressive mode, within a given time period, making a rough determination as to whether the increase in the residual echo is caused by double talk or an echo path change, and after the given time period, making a fine determination as to whether the increase in the residual echo is caused by double talk or an echo path change.

14. The echo canceller of claim 13, wherein the rough determination is made using the Geigel algorithm.

15. The echo canceller of claim 13, wherein the fine determination is made by determining the number of occurrences where the residual echo yielded by the adaptive filter coefficients updated in the aggressive mode is greater than the residual echo yielded by the retained adaptive filter coefficients within a given observation window.

16. The echo canceller of claim 15, wherein if the number of occurrences where the residual echo yielded by the adaptive filter coefficients updated in the aggressive mode is greater than the residual echo yielded by the retained adaptive filter coefficients within a given observation window is more than a few, the residual echo increase is caused by double talk, otherwise the residual echo increase is caused by an echo path change.

17. The echo canceller of claim 13, wherein if the increase in the residual echo is caused by an echo path change, said NLMS processor updates current filter coefficients with the adaptive filter coefficients updated in the aggressive mode and continues in the aggressive mode, and if the increase in the residual echo is caused by double talk, said NLMS processor updates the current filter coefficients with the retained adaptive filter coefficients and continues in an inhibition mode.

18. The echo canceller of claim 10, wherein upon call initiation, said NLMS processor is in the aggressive mode and once convergence is reached, switches to the slow mode.

19. A method of echo cancellation, comprising:
executing an NLMS algorithm, switchable between an aggressive mode for faster convergence and a slow mode for lower residual echo;
detecting an abrupt increase in the residual echo determining whether the increase in the residual echo is caused by at least one of double talk or an echo path change;
retaining adaptive filter coefficients at the time of the detection of the increase in residual echo;
updating the adaptive filter coefficients in the aggressive mode; and
within a given time period, making a rough determination as to whether the increase in the residual echo is caused by double talk or an echo path change;
after the given time period, making a fine determination as to whether the increase in the residual echo is caused by double talk or an echo path change; and
wherein said fine determining step including determining the number of occurrences where the residual echo yielded by the adaptive filter coefficients updated in the aggressive mode is greater than the residual echo yielded by the retained adaptive filter coefficients within a given observation window.

20. The method of claim 19, wherein if the number of occurrences where the residual echo yielded by the adaptive filter coefficients updated in the aggressive mode is greater than the residual echo yielded by the retained adaptive filter coefficient within a given observation window is more than a few, the residual echo increase is caused by double talk, otherwise the residual echo increase is caused by an echo path change.

21. The method of claim 19, further comprising:
determining if the increase in the residual echo is caused by an echo path change, updating current filter coefficients with the adaptive filter coefficients updated in the aggressive mode and continuing in the aggressive mode, and if the increase in the residual echo is caused by double talk, updating the current filter coefficients with the retained adaptive filter coefficients and continuing in an inhibition mode.

22. The method of claim 19, wherein said method is non-correlative.

23. The method of claim 19, wherein said rough determining step implementing the Geigel algorithm.

24. An echo canceller, comprising:
a normalized least mean squared (NLMS) processor for executing an NLMS algorithm, said NLMS processor being switchable between an aggressive mode for faster convergence and a slow mode for lower residual echo,
wherein said NLMS processor further detecting an abrupt increase in the residual echo and determining whether the increase in the residual echo is caused by double talk or an echo path change, said NLMS processor further retaining adaptive filter coefficients at the time of the detection of the increase in residual echo, updating the adaptive filter coefficients in the aggressive mode, within a given time period, making a rough determination as to whether the increase in the residual echo is caused by double talk or an echo path change, and after the given time period, making a fine determination as to whether the increase in the residual echo is caused by double talk or an echo path change, wherein the fine determination is made by determining the number of occurrences where the residual echo yielded by the adaptive filter coefficients updated in the aggressive mode is greater than the residual echo yielded by the retained adaptive filter coefficients within a given observation window.

25. The echo canceller of claim 24, wherein said echo canceller is non-correlative.

26. The echo canceller of claim 24, wherein the rough determination is made using the Geigel algorithm.

27. The echo canceller of claim 24, wherein if the number of occurrences where the residual echo yielded by the adaptive filter coefficients updated in the aggressive mode is greater than the residual echo yielded by the retained adaptive filter coefficients within a given observation window is more than a few, the residual echo increase is caused by double talk, otherwise the residual echo increase is caused by an echo path change.

28. The echo canceller of claim 24, wherein if the increase in the residual echo is caused by an echo path change, said NLMS processor updates current filter coefficients with the adaptive filter coefficients updated in the aggressive mode and continues in the aggressive mode, and if the increase in the residual echo is caused by double talk, said NLMS processor updates the current filter coefficients with the retained adaptive filter coefficients and continues in an inhibition mode.

* * * * *